United States Patent
Xu

(10) Patent No.: US 9,703,158 B2
(45) Date of Patent: Jul. 11, 2017

(54) LIQUID CRYSTAL DISPLAY PANEL AND LIQUID CRYSTAL DISPLAY APPARATUS HAVING THE SAME

(71) Applicant: Shenzhen China Star Optoelectronics Technology Co., Ltd., Shenzhen (CN)

(72) Inventor: Hongyuan Xu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 15 days.

(21) Appl. No.: 14/766,751

(22) PCT Filed: May 6, 2015

(86) PCT No.: PCT/CN2015/078384
§ 371 (c)(1),
(2) Date: Aug. 9, 2015

(87) PCT Pub. No.: WO2016/165175
PCT Pub. Date: Oct. 20, 2016

(65) Prior Publication Data
US 2016/0299396 A1    Oct. 13, 2016

(30) Foreign Application Priority Data
Apr. 13, 2015   (CN) ................. 2015 1 0170510

(51) Int. Cl.
*G02F 1/1343*    (2006.01)
*G02F 1/1362*    (2006.01)

(52) U.S. Cl.
CPC .. *G02F 1/136213* (2013.01); *G02F 1/136286* (2013.01); *G02F 2001/134345* (2013.01)

(58) Field of Classification Search
CPC ......... G02F 1/136213; G02F 1/136286; G02F 2001/134345
See application file for complete search history.

(56) References Cited

U.S. PATENT DOCUMENTS

2008/0316385 A1* 12/2008 Matsumura ....... G02F 1/134363
                                                                    349/39
2009/0269872 A1* 10/2009 Lee ................... G02F 1/136213
                                                                    438/30

* cited by examiner

*Primary Examiner* — Nathanael R Briggs

(57) ABSTRACT

A liquid crystal display panel is disclosed and has data lines, scanning lines and pixel units. Each pixel units includes a first sub-pixel unit and a second sub-pixel unit. A top electrode of a first storage capacitor of the first sub-pixel unit is connected to a common electrode; a bottom electrode plate of the first storage capacitor is connected to a pixel electrode of the corresponding pixel unit. A top electrode of a second storage capacitor of the second sub-pixel unit is connected to a pixel electrode of the corresponding pixel unit; and a bottom electrode plate of the second storage capacitor is connected to the common electrode.

17 Claims, 2 Drawing Sheets

LIQUID CRYSTAL DISPLAY PANEL AND LIQUID CRYSTAL DISPLAY APPARATUS HAVING THE SAME

RELATED APPLICATIONS

This application is a National Phase of PCT Patent Application No. PCT/CN2015/078384 having International filing date of May 6, 2015, which claims the benefit of priority of Chinese Patent Application No. 201510170510.8 filed on Apr. 13, 2015. The contents of the above applications are all incorporated by reference as if fully set forth herein in their entirety.

BACKGROUND OF THE INVENTION

Field of the Invention

The present invention relates to the field of liquid crystal display, and more particularly to a liquid crystal display panel and a liquid crystal display apparatus having the same.

Description of the Related Art

A liquid crystal display apparatus is a widely-used flat panel display device, which uses liquid crystal materials as switches to modulate light intensity of a backlight source so as to achieve image display. Liquid crystal devices may be divided into multiple display types, wherein the VA (vertical alignment) display type is a common display type that has advantages of high-contrast, wide view angle, and does not require rubbing process. However, VA display type requires vertical twisted liquid crystal materials which easily lead to a color washout problem under large view angles.

Thus, with regard to the conventional VA display type liquid crystal display apparatus, each pixel unit of the liquid crystal display panel of the liquid crystal display apparatus is designed to have a main pixel region and a secondary pixel region. Since pixel electrodes in the main pixel region and in the secondary pixel region of each pixel unit are applied with different voltages, the twisting angles of the liquid crystal molecules under the main pixel region and the secondary pixel region are different, thereby effectively solving the color washout problem.

However, the conventional designs of the main pixel region for the pixel units of the liquid crystal display panel are usually achieved by increasing the number of data lines or sharing capacitors; such design will lead to the decrease of aperture ratio of the liquid crystal display panel and the increasing of production cost.

Therefore, it is necessary to provide a liquid crystal display panel and a liquid crystal display apparatus having the same to overcome the problems existing in the conventional technology.

SUMMARY OF THE INVENTION

A main object of the present invention is to provide a liquid crystal display panel and a liquid crystal display apparatus having the same that are able to increase aperture ratio and reduce production cost so as to solve the technical problems where the conventional liquid crystal display panel and the liquid crystal display apparatus have lower aperture ratio and higher production cost.

The prevent invention provides a liquid crystal display panel having:
a plurality of data lines being used to transmit data signals;
a plurality of scanning lines being used to transmit scanning signals; and
a plurality of pixel units being configured by intersections of the data lines and the scanning lines; wherein each of the pixel units includes:
a first sub-pixel unit having:
a first liquid crystal capacitor being used to provide a twisting voltage for liquid crystal molecules in the first sub-pixel unit;
a first storage capacitor being used to provide voltage-holding electric charges for the first liquid crystal capacitor; and
a first switching transistor being used to provide the data signals to the first liquid crystal capacitor and the first storage capacitor; and
a second sub-pixel unit having:
a second liquid crystal capacitor being used to provide a twisting voltage for liquid crystal molecules in the second sub-pixel unit;
a second storage capacitor being used to provide voltage-holding electric charges for the second liquid crystal capacitor; and
a second switching transistor being used to provide the data signals to the second liquid crystal capacitor and the second storage capacitor; wherein
a top electrode plate of the first storage capacitor is connected to a common electrode, and a bottom electrode plate of the first storage capacitor is connected to a pixel electrode of the corresponding pixel unit; a top electrode plate of the second storage capacitor is connected to the pixel electrode of the corresponding pixel unit, and a bottom electrode plate of the second storage capacitor is connected to the common electrode;
an insulating layer and a semiconductor layer which performs unidirectional conducting are included between the top electrode plate of the first storage capacitor and the bottom electrode plate of the first storage capacitor;
an insulating layer and a semiconductor layer which performs unidirectional conducting are included between the top electrode plate of the second storage capacitor and the bottom electrode plate of the second storage capacitor;
when the data lines transmit positive data signals, the first storage capacitor has a first capacitance value; when the data lines transmit negative data signals, the first storage capacitor has a second capacitance value, wherein the first capacitance value is greater than the second capacitance value;
when the data lines transmit positive data signals, the second storage capacitor has a third capacitance value; when the data lines transmit negative data signals, the second storage capacitor has a fourth capacitance value, wherein the fourth capacitance value is greater than the third capacitance value;
a thickness of the semiconductor layer is greater than that of the insulating layer.

The embodiment of the present invention further provides another liquid crystal display panel including:
a plurality of data lines being used to transmit data signals;
a plurality of scanning lines being used to transmit scanning signals; and
a plurality of pixel units being configured by intersections of the data lines and the scanning lines; wherein each of the pixel units includes:
a first sub-pixel unit having:

a first liquid crystal capacitor being used to provide a twisting voltage for liquid crystal molecules in the first sub-pixel unit;

a first storage capacitor being used to provide voltage-holding electric charges for the first liquid crystal capacitor; and a first switching transistor being used to provide the data signals to the first liquid crystal capacitor and the first storage capacitor; and a second sub-pixel unit having:

a second liquid crystal capacitor being used to provide a twisting voltage for liquid crystal molecules in the second sub-pixel unit;

a second storage capacitor being used to provide voltage-holding electric charges for the second liquid crystal capacitor; and a second switching transistor being used to provide the data signals to the second liquid crystal capacitor and the second storage capacitor; wherein a top electrode plate of the first storage capacitor is connected to a common electrode, and a bottom electrode plate of the first storage capacitor is connected to a pixel electrode of the corresponding pixel unit; a top electrode plate of the second storage capacitor is connected to the pixel electrode of the corresponding pixel unit, and a bottom electrode plate of the second storage capacitor is connected to the common electrode.

In the liquid crystal display panel of the present invention, an insulating layer and a semiconductor layer which performs unidirectional conducting are included between the top electrode plate of the first storage capacitor and the bottom electrode plate of the first storage capacitor.

In the liquid crystal display panel of the present invention, an insulating layer and a semiconductor layer which performs unidirectional conducting are included between the top electrode plate of the second storage capacitor and the bottom electrode plate of the second storage capacitor.

In the liquid crystal display panel of the present invention, when the data lines transmit positive data signals, the first storage capacitor has a first capacitance value; when the data lines transmit negative data signals, the first storage capacitor has a second capacitance value, wherein the first capacitance value is greater than the second capacitance value.

In the liquid crystal display panel of the present invention, when the data lines transmit positive data signals, the second storage capacitor has a third capacitance value; when the data lines transmit negative data signals, the second storage capacitor has a fourth capacitance value, wherein the fourth capacitance value is greater than the third capacitance value.

In the liquid crystal display panel of the present invention, when the data lines transmit positive signals and the scanning lines are in a transition from a high level to a low level, a voltage across two ends of the first storage capacitor is greater than that of the second storage capacitor.

In the liquid crystal display panel of the present invention, when the data lines transmit negative signals and the scanning lines are in a transition from a high level to a low level, a voltage across two ends of the first storage capacitor is greater than that of the second storage capacitor.

In the liquid crystal display panel of the present invention, a thickness of the semiconductor layer is greater than that of the insulating layer.

The present invention further provides a liquid crystal display apparatus having:

a backlight source; and a liquid crystal display panel comprising:

a plurality of data lines being used to transmit data signals;

a plurality of scanning lines being used to transmit scanning signals; and a plurality of pixel units being configured by intersections of the data lines and the scanning lines; wherein each of the pixel units includes:

a first sub-pixel unit having:

a first liquid crystal capacitor being used to provide a twisting voltage for liquid crystal molecules in the first sub-pixel unit;

a first storage capacitor being used to provide voltage-holding electric charges for the first liquid crystal capacitor; and a first switching transistor being used to provide the data signals to the first liquid crystal capacitor and the first storage capacitor; and a second sub-pixel unit having:

a second liquid crystal capacitor being used to provide a twisting voltage for liquid crystal molecules in the second sub-pixel unit;

a second storage capacitor being used to provide voltage-holding electric charges for the second liquid crystal capacitor; and a second switching transistor being used to provide the data signals to the second liquid crystal capacitor and the second storage capacitor; wherein a top electrode plate of the first storage capacitor is connected to a common electrode, and a bottom electrode plate of the first storage capacitor is connected to a pixel electrode of the corresponding pixel unit; a top electrode plate of the second storage capacitor is connected to the pixel electrode of the corresponding pixel unit, and a bottom electrode plate of the second storage capacitor is connected to the common electrode.

In the liquid crystal display apparatus of the present invention, an insulating layer and a semiconductor layer which performs unidirectional conducting are included between the top electrode plate of the first storage capacitor and the bottom electrode plate of the first storage capacitor.

In the liquid crystal display apparatus of the present invention, an insulating layer and a semiconductor layer which performs unidirectional conducting are included between the top electrode plate of the second storage capacitor and the bottom electrode plate of the second storage capacitor.

In the liquid crystal display apparatus of the present invention, when the data lines transmit positive data signals, the first storage capacitor has a first capacitance value; when the data lines transmit negative data signals, the first storage capacitor has a second capacitance value, wherein the first capacitance value is greater than the second capacitance value.

In the liquid crystal display apparatus of the present invention, when the data lines transmit positive data signals, the second storage capacitor has a third capacitance value; when the data lines transmit negative data signals, the second storage capacitor has a fourth capacitance value, wherein the fourth capacitance value is greater than the third capacitance value.

In the liquid crystal display apparatus of the present invention, when the data lines transmit positive signals and the scanning lines are in a transition from a high level to a low level, a voltage across two ends of the first storage capacitor is greater than that of the second storage capacitor.

In the liquid crystal display apparatus of the present invention, when the data lines transmit negative signals and the scanning lines are in a transition from a high level to a low level, a voltage across two ends of the first storage capacitor is greater than that of the second storage capacitor.

In the liquid crystal display apparatus of the present invention, a thickness of the semiconductor layer is greater than that of the insulating layer.

Compared with the conventional liquid crystal display panel and liquid crystal display apparatus, the liquid crystal display panel and liquid crystal display apparatus of the present invention, by having the first storage capacitor and the second storage capacitor, can achieve that a twist angle of the liquid crystal molecules in an area corresponding to the first sub-pixel unit differs from that of the liquid crystal molecules in an area corresponding to the second sub-pixel unit, thus effectively solving the color washout problem and increasing the aperture ratio of the liquid crystal display panel and reducing the production cost of the liquid crystal display panel at the same time, and thereby solving the technical problems where the conventional liquid crystal display panel and the liquid crystal display apparatus have lower aperture ratio and higher production cost.

In order to make the contents of the present invention more easily understood, the preferred embodiments of the present invention are described in detail, in cooperation with accompanying drawings, as follows.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto.

Figure 1:
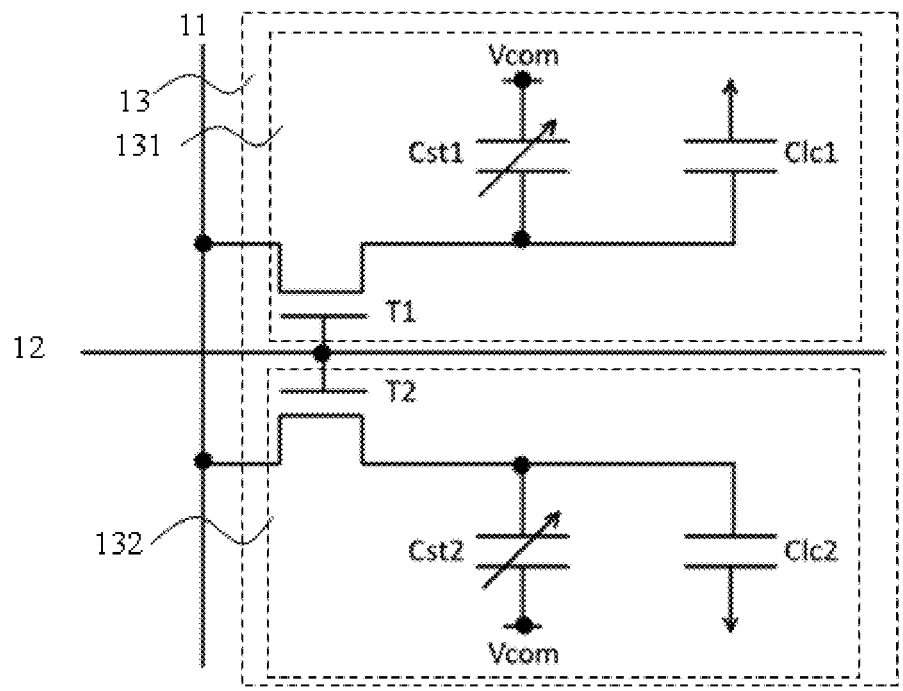
FIG. 1 is a schematic diagram of the structure of a pixel unit of a liquid crystal display panel according to a preferred embodiment of the present invention.

With reference to FIG. 1, FIG. 1 is a schematic diagram of the structure of a pixel unit of a liquid crystal display panel according to a preferred embodiment of the present invention. The liquid crystal display panel comprises a plurality of data lines 11, a plurality of scanning lines 12 and a plurality of pixel units 13. The data lines 11 are used to transmit data signals. The scanning lines 12 are used to transmit scanning signals. The pixel units 13 are configured by intersections of the data lines 11 and the scanning lines 12. Each of the pixel units 13 includes a first sub-pixel unit 131 and a second sub-pixel unit 132. The first sub-pixel unit 131 includes a first liquid crystal capacitor Clc1, a first storage capacitor Cst1 and a first switching transistor T1. The second sub-pixel unit 132 includes a second liquid crystal capacitor Clc2, a second storage capacitor Cst2 and a second switching transistor T2. The first liquid crystal capacitor Clc1 is used to provide a twisting voltage for liquid crystal molecules in the first sub-pixel unit 131. The first storage capacitor Clc1 is used to provide voltage-holding electric charges for the first liquid crystal capacitor Clc1. The first switching transistor T1 is used to provide the data signals to the first liquid crystal capacitor Clc1 and the first storage capacitor Cst1. The second liquid crystal capacitor Clc2 is used to provide a twisting voltage for liquid crystal molecules in the second sub-pixel unit 132; the second storage capacitor Cst2 is used to provide voltage-holding electric charges for the second liquid crystal capacitor Clc2; the second switching transistor T2 is used to provide the data signals to the second liquid crystal capacitor Clc2 and the second storage capacitor Cst2.

In the present preferred embodiment, a top electrode plate of the first storage capacitor Cst1 of the first sub-pixel unit 131 is connected to a common electrode Vcom; a bottom electrode plate of the first storage capacitor Cst1 is connected to a pixel electrode of the corresponding pixel unit; a top electrode plate of the second storage capacitor Cst2 of the second sub-pixel unit 132 is connected to the pixel electrode of the corresponding pixel unit, and a bottom electrode plate of the second storage capacitor Cst2 is connected to the common electrode Vcom.

Figure 2:
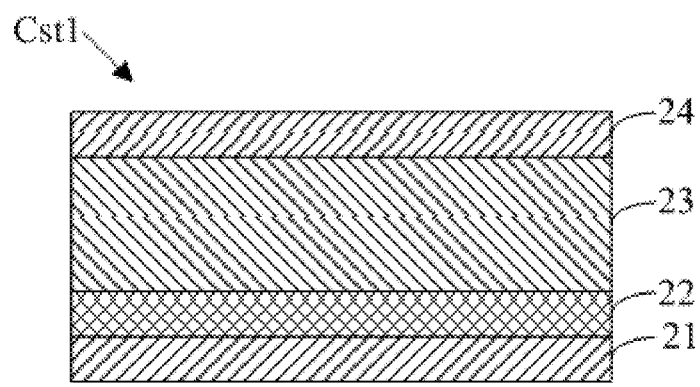
FIG. 2 is a schematic diagram of the structure of a first storage capacitor of a first sub-pixel unit of the pixel unit of the liquid crystal display panel according to the preferred embodiment of the present invention.

With reference to FIG. 2, FIG. 2 is a schematic diagram of the structure of a first storage capacitor of a first sub-pixel unit of the pixel unit of the liquid crystal display panel according to the preferred embodiment of the present invention. The first storage capacitor Cst1 includes a bottom electrode plate 21, an insulating layer 22, a semiconductor layer 23 and a top electrode plate 24. The bottom electrode plate 21 is a metal layer. The semiconductor layer 23 is a unidirectional conducting layer (That is, when the electric potential of the bottom electrode plate 21 is greater than that of the top electrode plate 24, the semiconductor layer 23 is insulated; when the electric potential of the bottom electrode plate 21 is lower than that of the top electrode plate 24, the semiconductor layer 23 is conductive). The top electrode plate 24 is a metal layer. The first storage capacitor Cst1 may be formed through the following steps:

First form a metal layer by means of physical vapor deposition, and then perform a patterning treatment on the metal layer to form the bottom electrode plate 21. Then form the insulating layer 22, such as a silicon nitride layer, by means of chemical vapor deposition, wherein the thickness of the insulating layer 22 may be 50 nm. Then form the semiconductor layer 23, such as an amorphous silicon layer, by means of chemical vapor deposition, wherein the thickness of the semiconductor layer 23 may be 150 nm. Finally, form another metal layer by means of physical vapor deposition, and then perform a patterning treatment on this metal layer to form the top electrode plate 24. The top electrode plate 24 of the first storage capacitor Cst1 is connected to the common electrode Vcom via a corresponding conductive through hole; and the bottom electrode plate 21 of the first storage capacitor Cst1 is connected to a corresponding pixel unit also via another corresponding conductive through hole.

Figure 3:
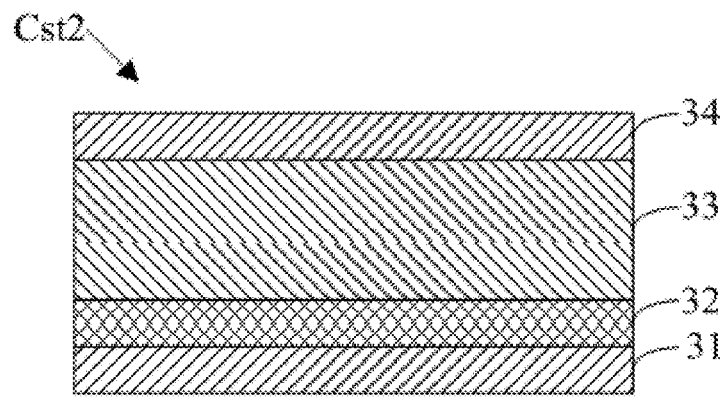
FIG. 3 is a schematic diagram of the structure of a second storage capacitor of a second sub-pixel unit of the pixel unit of the liquid crystal display panel according to the preferred embodiment of the present invention.

With reference to FIG. 3, FIG. 3 is a schematic diagram of the structure of a second storage capacitor of a second sub-pixel unit of the pixel unit of the liquid crystal display panel according to the preferred embodiment of the present invention. The second storage capacitor Cst2 includes a bottom electrode plate 31, an insulating layer 32, a semiconductor layer 33 and a top electrode plate 34. The bottom electrode plate 31 is a metal layer. The semiconductor layer 33 is a unidirectional conducting layer (That is, when the electric potential of the bottom electrode plate 31 is greater than that of the top electrode plate 34, the semiconductor layer 33 is insulated; when the electric potential of the bottom electrode plate 31 is lower than that of the top electrode plate 34, the semiconductor layer 33 is conductive). The top electrode plate 34 is a metal layer. The second storage capacitor Cst2 may be formed through the following steps:

First form a metal layer by means of physical vapor deposition, and then perform a patterning treatment on the metal layer to form the bottom electrode plate 31. Then form the insulating layer 32, such as a silicon nitride layer, by means of chemical vapor deposition, wherein the thickness of the insulating layer 32 may be 50 nm. Then form the semiconductor layer 33, such as an amorphous silicon layer, by means of chemical vapor deposition, wherein the thickness of the semiconductor layer 33 may be 150 nm. Finally, form another metal layer by means of physical vapor deposition, and then perform a patterning treatment on this metal layer to form the top electrode plate 34. The top electrode plate 34 of the second storage capacitor Cst2 is directly connected to a corresponding pixel electrode; and the bottom electrode plate 31 of the second storage capacitor Cst2 is directly connected to the common electrode Vcom.

Figure 4:
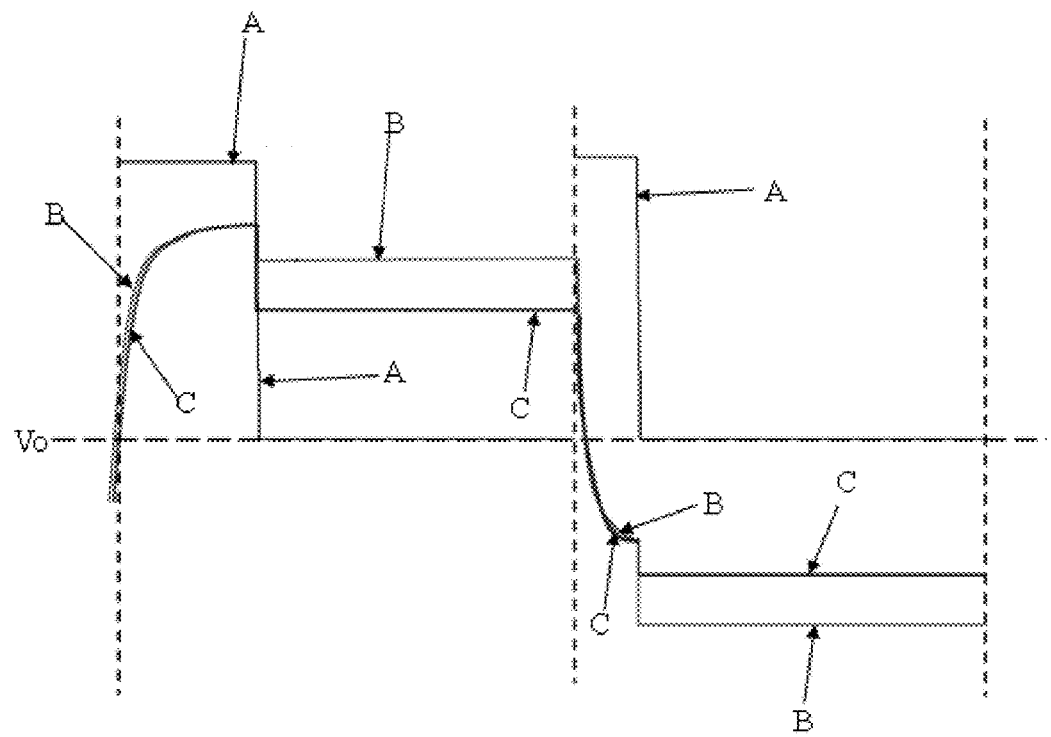
FIG. 4 is a voltage signal waveform diagram of the pixel unit of the liquid crystal display panel according to the preferred embodiment of the present invention.

The operation process of the liquid crystal display panel of the present preferred embodiment is shown in FIG. 4, which is a voltage signal waveform diagram of the pixel unit of the liquid crystal display panel according to the preferred embodiment of the present invention. The left half of FIG. 4 shows the voltage signal waveforms of the first storage capacitor Cst1 and the second storage capacitor Cst2 when the data line 11 is inputted with positive data signal; and the right half of FIG. 4 shows the voltage signal waveforms of the first storage capacitor Cst1 and the second storage capacitor Cst2 when the data line 11 is inputted with negative data signal. In FIG. 4, curve line A is the scanning signal; curve line B is the voltage signal of the first storage capacitor Cst1; curve line C is the voltage signal of the second storage capacitor Cst2; and V0 is the voltage signal of the common electrode.

When the data line 11 is inputted with a positive data signal, the electric potential of the bottom electrode plate 21 of the first storage capacitor Cst1 is higher than that of the top electrode plate 24 of the first storage capacitor Cst1, then the semiconductor layer 23 of the first storage capacitor Cst1 is conductive. The capacitance value of the first storage capacitor Cst1 at the time is defined as a first capacitance value C1, and the first capacitance value C1 satisfies:

$C1=\epsilon*S/d1$; wherein $\epsilon$ is the permittivity, S is the area of the capacitor, d1 is the thickness of the insulating layer 22 of the first storage capacitor Cst1.

When the data line 11 is inputted with a negative data signal, the electric potential of the bottom electrode plate 21 of the first storage capacitor Cst1 is lower than that of the top electrode plate 24 of the first storage capacitor Cst1, then the semiconductor layer 23 of the first storage capacitor Cst1 is insulated. The capacitance value of the first storage capacitor Cst1 at the time is defined as a second capacitance value C2, and the second capacitance value C2 satisfies:

$C2=\epsilon*S/d2$; wherein $\epsilon$ is the permittivity, S is the area of the capacitor, d2 is the total thickness of the insulating layer 22 and the semiconductor layer 23 of the first storage capacitor Cst1.

Thus, the first capacitance value C1 is greater than the second capacitance value C2.

When the data line 11 is inputted with a positive signal, the electric potential of the bottom electrode plate 31 of the second storage capacitor Cst2 is lower than that of the top electrode plate 34 of the second storage capacitor Cst2, then the semiconductor layer 33 of the second storage capacitor Cst2 is insulated. The capacitance value of the second storage capacitor Cst2 at the time is defined as a third capacitance value C3, and the third capacitance value C3 satisfies:

$C3=\epsilon*S/d3$; wherein $\epsilon$ is the permittivity, S is the area of the capacitor, d3 is the total thickness of the insulating layer 32 and the semiconductor layer 33 of the second storage capacitor Cst2.

When the data line 11 is inputted with a negative data signal, the electric potential of the bottom electrode plate 31 of the second storage capacitor Cst2 is higher than that of the top electrode plate 34 of the second storage capacitor Cst2, then the semiconductor layer 33 of the second storage capacitor Cst2 is conductive. The capacitance value of the second storage capacitor Cst2 at the time is defined as a fourth capacitance value C4, and the fourth capacitance value C4 satisfies:

$C4=\epsilon*S/d4$; wherein $\epsilon$ is the permittivity, S is the area of the capacitor, d4 is the thickness of the insulating layer 32 of the second storage capacitor Cst2.

Thus, the fourth capacitance value C4 is greater than the third capacitance value C3.

When the liquid crystal display panel of the present preferred embodiment is working, the first capacitance value C1 of the first storage capacitor Cst1 is greater than the second capacitance value C2, and the third capacitance value C3 of the second storage capacitor Cst2 is lower than the fourth capacitance value C4, and the area S and permittivity 8 of the first storage capacitance Cst1 and that of the second storage capacitor Cst2 are considered the same or similar, thus the first capacitance value C1 is greater than the third capacitance value C3, and the fourth capacitance value C1 is greater than the second capacitance value C2.

When the data lines 11 transmits positive data signals, and the scanning lines 12 are in a transition from a high level to a low level, the first storage capacitor Cst1 will be less affected by the change of scanning signals, and the second storage capacitor Cst2 will be more affected by the change of scanning signals; therefore, the voltage signal of the first storage capacitor Cst1 shown as the curve line B in the left side of FIG. 4 has less reduction; and the voltage signal of the second storage capacitor Cst2 shown as the curve line C in the left side of FIG. 4 has more reduction; a voltage across two ends of the first storage capacitor Cst1 (that is, the difference between the dropped voltage signal of the first storage capacitor Cst1 and V0) is greater than that of the second storage capacitor Cst2 (that is, the difference between the dropped voltage signal of the second storage capacitor Cst1 and V0).

When the data lines 11 transmits negative data signals, and the scanning lines 12 are in a transition from a high level to a low level, the first storage capacitor Cst1 will be more affected by the change of scanning signals, and the second storage capacitor Cst2 will be less affected by the change of scanning signals; therefore, the voltage signal of the first storage capacitor Cst1 shown as the curve line B in the right side of FIG. 4 has more reduction; and the voltage signal of the second storage capacitor Cst2 shown as the curve line C in the right side of FIG. 4 has less reduction; a voltage across two ends of the first storage capacitor Cst1 is still greater than that of the second storage capacitor Cst2.

Thus, no matter what the data lines 11 transmit are positive data signals or negative data signals, when the liquid crystal display panel is displaying, the voltage across two ends of the first storage capacitor Cst1 is still greater than that of the second storage capacitor Cst2, that is, the driving voltage for the first sub-pixel unit 131 all is greater than the that of the second sub-pixel unit 132, which effective ensures that a twist angle of the liquid crystal molecules in an area corresponding to the first sub-pixel unit 131 differs from that of the liquid crystal molecules in an area corresponding to the second sub-pixel unit 132, thus effectively solving the color washout problem. In the meantime, the liquid crystal display panel of the present preferred embodiment does not require extra data lines or sharing capacitors to achieve the driving of the first sub-pixel unit 131 and the second sub-pixel unit 132, thereby increasing the aperture ratio of the liquid crystal display panel and reducing the production cost of the liquid crystal display panel.

In the preferred embodiment, a thickness of the semiconductor layer 23 of the first storage capacitor Cst1 is preferably greater than that of the corresponding insulating layer 22, and a thickness of the semiconductor layer 33 of the second storage capacitor Cst2 is preferably greater than that of the corresponding insulating layer 32 so that the first sub-pixel unit 131 and the second sub-pixel unit 132 can have larger difference in driving voltage to further avoid the occurrence of color-washout problem.

The present invention further provides a liquid crystal display apparatus. The liquid crystal display apparatus includes a backlight source and a liquid crystal display panel. The liquid crystal display panel includes a plurality of data lines, a plurality of scanning lines and a plurality of pixel units. The data lines are used to transmit data signals; the scanning lines are used to transmit scanning signals; and the pixel units are configured by intersections of the data lines and the scanning lines. Each of the pixel units includes a first sub-pixel unit and a second sub-pixel unit. The first sub-pixel unit has a first liquid crystal capacitor, a first storage capacitor and a first switching transistor. The second sub-pixel unit has a second liquid crystal capacitor, a second storage capacitor and a second switching transistor. The first liquid crystal capacitor is used to provide a twisting voltage for liquid crystal molecules in the first sub-pixel unit; the first storage capacitor is used to provide voltage-holding electric charges for the first liquid crystal capacitor; the first switching transistor being used to provide the data signals to the first liquid crystal capacitor and the first storage capacitor. The second liquid crystal capacitor is used to provide a twisting voltage for liquid crystal molecules in the second sub-pixel; the second storage capacitor is used to provide voltage-holding electric charges for the second liquid crystal capacitor; the second switching transistor being used to provide the data signals to the second liquid crystal capacitor and the second storage capacitor.

Preferably, an insulating layer and a semiconductor layer which performs unidirectional conducting are included between the top electrode plate of the first storage capacitor and the bottom electrode plate of the first storage capacitor; an insulating layer and a semiconductor layer which performs unidirectional conducting are included between the top electrode plate of the second storage capacitor and the bottom electrode plate of the second storage capacitor.

Preferably, when the data lines transmit positive data signals, the first storage capacitor has a first capacitance value; when the data lines transmit negative data signals, the first storage capacitor has a second capacitance value, wherein the first capacitance value is greater than the second capacitance value; when the data lines transmit positive data signals, the second storage capacitor has a third capacitance value; when the data lines transmit negative data signals, the second storage capacitor has a fourth capacitance value, wherein the fourth capacitance value is greater than the third capacitance value.

Preferably, when the data lines transmit positive signals and the scanning lines are in a transition from a high level to a low level, a voltage across two ends of the first storage capacitor is greater than that of the second storage capacitor; when the data lines transmit negative signals and the scanning lines are in a transition from a high level to a low level, a voltage across two ends of the first storage capacitor is greater than that of the second storage capacitor.

Preferably, a thickness of the semiconductor layer is greater than that of the insulating layer.

The working theory and advantages of the liquid crystal display apparatus of the present invention is the same as the above-mentioned specific embodiments of the liquid crystal display panel, therefore please refer to the foregoing embodiments for understanding the specific structure of the liquid crystal display apparatus.

The liquid crystal display panel and liquid crystal display apparatus of the present invention, by having the first storage capacitor and the second storage capacitor, can achieve that a twist angle of the liquid crystal molecules in an area corresponding to the first sub-pixel unit differs from that of the liquid crystal molecules in an area corresponding to the second sub-pixel unit, thus effectively solving the color washout problem and increasing the aperture ratio of the liquid crystal display panel and reducing the production cost of the liquid crystal display panel at the same time, and thereby solving the technical problems where the conventional liquid crystal display panel and the liquid crystal display apparatus have lower aperture ratio and higher production cost.

The present invention has been described with preferred embodiments thereof, and it is understood that many changes and modifications to the described embodiment can be carried out without departing from the scope and the spirit of the invention that is intended to be limited only by the appended claims.

What is claimed is:
1. A liquid crystal display panel comprising:
a plurality of data lines being used to transmit data signals;
a plurality of scanning lines being used to transmit scanning signals; and
a plurality of pixel units being configured by intersections of the data lines and the scanning lines; wherein each of the pixel units includes:
a first sub-pixel unit having:
a first liquid crystal capacitor being used to provide a twisting voltage for liquid crystal molecules in the first sub-pixel unit;
a first storage capacitor being used to provide voltage-holding electric charges for the first liquid crystal capacitor; and a first switching transistor being used to provide the data signals to the first liquid crystal capacitor and the first storage capacitor; and a second sub-pixel unit having:
a second liquid crystal capacitor being used to provide a twisting voltage for liquid crystal molecules in the second sub-pixel unit;
a second storage capacitor being used to provide voltage-holding electric charges for the second liquid crystal capacitor; and
a second switching transistor being used to provide the data signals to the second liquid crystal capacitor and the second storage capacitor; wherein a top electrode plate of the first storage capacitor is connected to a common electrode, and a bottom electrode plate of the first storage capacitor is connected to a pixel electrode of the corresponding pixel unit; a top electrode plate of the second storage capacitor is connected to the pixel electrode of the corresponding pixel unit, and a bottom electrode plate of the second storage capacitor is connected to the common electrode;

an insulating layer and a semiconductor layer which performs unidirectional conducting are included between the top electrode plate of the first storage capacitor and the bottom electrode plate of the first storage capacitor;

an insulating layer and a semiconductor layer which performs unidirectional conducting are included between the top electrode plate of the second storage capacitor and the bottom electrode plate of the second storage capacitor;

when the data lines transmit positive data signals, the first storage capacitor has a first capacitance value; when the data lines transmit negative data signals, the first storage capacitor has a second capacitance value, wherein the first capacitance value is greater than the second capacitance value;

when the data lines transmit positive data signals, the second storage capacitor has a third capacitance value; when the data lines transmit negative data signals, the second storage capacitor has a fourth capacitance value, wherein the fourth capacitance value is greater than the third capacitance value;

a thickness of the semiconductor layer is greater than that of the insulating layer; wherein when the data lines transmit positive signals and the scanning lines are in a transition from a high level to a low level, a voltage across two ends of the first storage capacitor is greater than that of the second storage capacitor.

2. A liquid crystal display panel comprising:
a plurality of data lines being used to transmit data signals;
a plurality of scanning lines being used to transmit scanning signals; and
a plurality of pixel units being configured by intersections of the data lines and the scanning lines; wherein
each of the pixel units includes:
a first sub-pixel unit having:
a first liquid crystal capacitor being used to provide a twisting voltage for liquid crystal molecules in the first sub-pixel unit;
a first storage capacitor being used to provide voltage-holding electric charges for the first liquid crystal capacitor; and
a first switching transistor being used to provide the data signals to the first liquid crystal capacitor and the first storage capacitor; and
a second sub-pixel unit having:
a second liquid crystal capacitor being used to provide a twisting voltage for liquid crystal molecules in the second sub-pixel unit;
a second storage capacitor being used to provide voltage-holding electric charges for the second liquid crystal capacitor; and
a second switching transistor being used to provide the data signals to the second liquid crystal capacitor and the second storage capacitor; wherein
a top electrode plate of the first storage capacitor is connected to a common electrode, and a bottom electrode plate of the first storage capacitor is connected to a pixel electrode of the corresponding pixel unit; a top electrode plate of the second storage capacitor is connected to the pixel electrode of the corresponding pixel unit, and a bottom electrode plate of the second storage capacitor is connected to the common electrode; wherein
when the data lines transmit positive signals and the scanning lines are in a transition from a high level to a low level, a voltage across two ends of the first storage capacitor is greater than that of the second storage capacitor.

3. The liquid crystal display panel as claimed in claim 2, wherein an insulating layer and a semiconductor layer which performs unidirectional conducting are included between the top electrode plate of the first storage capacitor and the bottom electrode plate of the first storage capacitor.

4. The liquid crystal display panel as claimed in claim 2, wherein an insulating layer and a semiconductor layer which performs unidirectional conducting are included between the top electrode plate of the second storage capacitor and the bottom electrode plate of the second storage capacitor.

5. The liquid crystal display panel as claimed in claim 2, wherein when the data lines transmit positive data signals, the first storage capacitor has a first capacitance value; when the data lines transmit negative data signals, the first storage capacitor has a second capacitance value, wherein the first capacitance value is greater than the second capacitance value.

6. The liquid crystal display panel as claimed in claim 2, wherein when the data lines transmit positive data signals, the second storage capacitor has a third capacitance value; when the data lines transmit negative data signals, the second storage capacitor has a fourth capacitance value, wherein the fourth capacitance value is greater than the third capacitance value.

7. The liquid crystal display panel as claimed in claim 2, wherein when the data lines transmit negative signals and the scanning lines are in a transition from a high level to a low level, a voltage across two ends of the first storage capacitor is greater than that of the second storage capacitor.

8. The liquid crystal display panel as claimed in claim 3, wherein a thickness of the semiconductor layer is greater than that of the insulating layer.

9. The liquid crystal display panel as claimed in claim 4, wherein a thickness of the semiconductor layer is greater than that of the insulating layer.

10. A liquid crystal display apparatus comprising:
a backlight source; and
a liquid crystal display panel comprising:
a plurality of data lines being used to transmit data signals;

a plurality of scanning lines being used to transmit scanning signals; and a plurality of pixel units being configured by intersections of the data lines and the scanning lines; wherein each of the pixel units includes:
- a first sub-pixel unit having:
  - a first liquid crystal capacitor being used to provide a twisting voltage for liquid crystal molecules in the first sub-pixel unit;
  - a first storage capacitor being used to provide voltage-holding electric charges for the first liquid crystal capacitor; and
  - a first switching transistor being used to provide the data signals to the first liquid crystal capacitor and the first storage capacitor; and
- a second sub-pixel unit having:
  - a second liquid crystal capacitor being used to provide a twisting voltage for liquid crystal molecules in the second sub-pixel unit;
  - a second storage capacitor being used to provide voltage-holding electric charges for the second liquid crystal capacitor; and
  - a second switching transistor being used to provide the data signals to the second liquid crystal capacitor and the second storage capacitor; wherein a top electrode plate of the first storage capacitor is connected to a common electrode, and a bottom electrode plate of the first storage capacitor is connected to a pixel electrode of the corresponding pixel unit; a top electrode plate of the second storage capacitor is connected to the pixel electrode of the corresponding pixel unit, and a bottom electrode plate of the second storage capacitor is connected to the common electrode; wherein when the data lines transmit positive signals and the scanning lines are in a transition from a high level to a low level, a voltage across two ends of the first storage capacitor is greater than that of the second storage capacitor.

11. The liquid crystal display apparatus as claimed in claim 10, wherein an insulating layer and a semiconductor layer which performs unidirectional conducting are included between the top electrode plate of the first storage capacitor and the bottom electrode plate of the first storage capacitor.

12. The liquid crystal display apparatus as claimed in claim 10, wherein an insulating layer and a semiconductor layer which performs unidirectional conducting are included between the top electrode plate of the second storage capacitor and the bottom electrode plate of the second storage capacitor.

13. The liquid crystal display apparatus as claimed in claim 10, wherein when the data lines transmit positive data signals, the first storage capacitor has a first capacitance value; when the data lines transmit negative data signals, the first storage capacitor has a second capacitance value, wherein the first capacitance value is greater than the second capacitance value.

14. The liquid crystal display apparatus as claimed in claim 10, wherein when the data lines transmit positive data signals, the second storage capacitor has a third capacitance value; when the data lines transmit negative data signals, the second storage capacitor has a fourth capacitance value, wherein the fourth capacitance value is greater than the third capacitance value.

15. The liquid crystal display apparatus as claimed in claim 10, wherein when the data lines transmit negative signals and the scanning lines are in a transition from a high level to a low level, a voltage across two ends of the first storage capacitor is greater than that of the second storage capacitor.

16. The liquid crystal display apparatus as claimed in claim 12, wherein a thickness of the semiconductor layer is greater than that of the insulating layer.

17. The liquid crystal display apparatus as claimed in claim 12, wherein a thickness of the semiconductor layer is greater than that of the insulating layer.

* * * * *